(12) United States Patent
Xue et al.

(10) Patent No.: US 8,983,429 B2
(45) Date of Patent: Mar. 17, 2015

(54) TEMPORARILY DISABLE OUT-OF-CREDIT PCC RULE

(75) Inventors: Xiong Xue, Kanata (CA); Ivy Mao, Kanata (CA); Shanawaz Shaik, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 7 days.

(21) Appl. No.: 13/483,150

(22) Filed: May 30, 2012

(65) Prior Publication Data

US 2013/0324078 A1    Dec. 5, 2013

(51) Int. Cl.
*H04M 11/00* (2006.01)

(52) U.S. Cl.
USPC .......................................................... 455/406

(58) Field of Classification Search
CPC .......... H04W 4/24; H04W 2215/8166; H04W 2215/8175
USPC ................................................. 455/406–408
See application file for complete search history.

(56) References Cited

U.S. PATENT DOCUMENTS

2009/0270069 A1* 10/2009 Plymoth et al. ............... 455/407
2012/0221693 A1*  8/2012 Cutler et al. ................... 709/223

OTHER PUBLICATIONS

"3rd Generation Partnership project", Technical Specification Group Core Network and Terminals; Policy and Charging Control (PCC) over Gx/Sd reference point ( Release 2011),, 3rd Generation Partnership project (3GPP), Mobile Competence Centre, 650, route des Lucioles; Sophia-Antipolis Cedex; France, XP050588820, Mar. 14, 2012.
"International Search Report for PCT/CA2013/050325, dated Jul. 26, 2013".

* cited by examiner

*Primary Examiner* — Vladimir Magloire
(74) *Attorney, Agent, or Firm* — Kramer Amado P.C.

(57) ABSTRACT

Various exemplary embodiments relate to a method performed by a policy and charging rules node (PCRN), the method comprising: receiving an event trigger from a policy and charging enforcement node (PCEN) indicating that a subscriber is out of credit; installing temporary PCC rules to handle the out of credit status of the subscriber; receiving an indication that the subscriber has completed a reallocation of credit action; uninstalling the temporary PCC rules and restoring the original PCC rules after receiving an indication of reallocation of credit.

17 Claims, 4 Drawing Sheets

TEMPORARILY DISABLE OUT-OF-CREDIT PCC RULE

TECHNICAL FIELD

Various exemplary embodiments disclosed herein relate generally to controlling usage of a subscriber in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications, including the following components: Policy and Charging Rules Function (PCRF); Policy and Charging Enforcement Function (PCEF); and Bearer Binding and Event Reporting Function (BBERF) of the EPC. These specifications further provide some guidance as to how these elements interact in order to provide reliable data services and charge subscribers for use thereof.

Within these communication networks, metering may be used to measure usage of the communication network by subscribers. When a prepaid subscriber reaches their usage limit, the telecommunication network must provide a way for the subscriber to continue, for example, a call when they run out of credit.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN), the method comprising receiving an event trigger associated with a first set of policy and charging control (PCC) rules from a policy and charging enforcement node (PCEN) indicating that a subscriber is out of credit; determining that the original policy and charging control (PCC) rules with the Final-Unit-Indication AVP in a Charing-Rule-Report AVP has a temporarily inactive status; installing temporary FCC rules to handle the out of credit status of the subscriber; receiving an indication that the subscriber has received a reallocation of credit; and uninstalling the temporary rules after receiving an indication that the subscriber has received a reallocation of credit.

Various exemplary embodiments relate to a policy and charging rules node (PCRN), comprising: a network interface configured to: receive an event trigger associated with a first set of policy and charging control (PCC) rules from a policy and charging enforcement node (PCEN) indicating that a subscriber is out of credit; and receive an indication that the subscriber has received a reallocation of credit; a PCC rules engine configured to: install a second set of rules to handle the out of credit status of the subscriber; and uninstall the second set of rules after receiving an indication that the subscriber has completed the reallocation of credit operation.

Various exemplary embodiments relate to a non-transitory machine-readable storage medium of claim 16, further comprising: instructions for determining that the first set of FCC rules associated with the event trigger has an active status or PCC-rule-status is not found in a corresponding charging-rule-report AVP; instructions for setting a flow status for the first set of PCC rules to disabled; and instructions for after receiving an indication that the subscriber has received a reallocation of credit: setting the flow status for the first set of PCC rules to enabled after receiving an indication that the subscriber has received a reallocation of credit.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
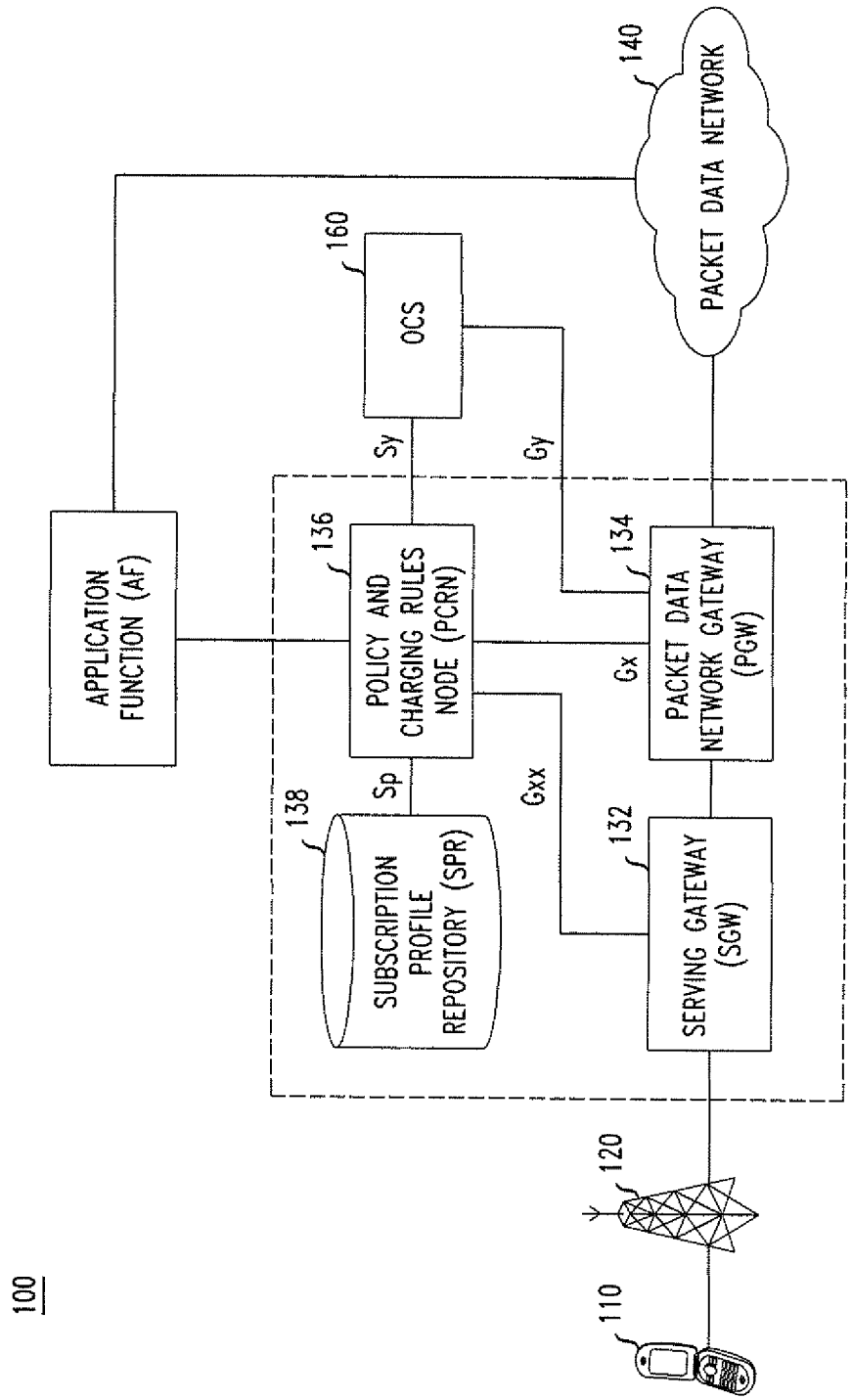
FIG. 1 illustrates an exemplary subscriber network for providing various data services.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, application function (AF) 150, and online charging system (OCS) 160.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to various 3GPP standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, POW 134 may be a policy and charging enforcement node (PCEN). POW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) from AF 150. Upon receipt of AAR 160, PCRN 136 may generate at least one new PCC rule for fulfilling the application request.

PCRN 136 may also be in communication with SGW 132 and PGW 134 via a Gxx and a Gx interface, respectively. PCRN 136 may receive an application request in the form of a credit control request (CCR) (not shown) from SOW 132 or PGW 134. As with AAR, upon receipt of a CCR, PCRN may generate at least one new PCC rule for fulfilling the application request 170. In various embodiments, AAR and the CCR may represent two independent application requests to be processed separately, while in other embodiments, AAR and the CCR may carry information regarding a single application request and PCRN 136 may create at least one PCC rule based on the combination of AAR and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PA/HP standard for example, PCRN 136 may also generate QoS rules. Upon creating a new QoS rule or upon request by the SOW 132, PCRN 136 may provide a QoS rule to SGW 132 via the Gxx interface. These QoS rules may be applied based upon usage information received from the OCS 160. When the OCS 160 indicates that certain usage thresholds have been reached, the PCRF 105 may change the QoS related to a subscriber and apply updated QoS rules to the PCEF 125.

The PCRN 136 may include network interfaces for communication with other network node, a PCC rule engine, and PCC rule storage. For example, the PCRN 136 may receive an OUT_OF_CREDIT trigger event via the network interface, and pass that event to the PCC rule engine for processing. The PCC rule engine may make decisions regarding existing rules and to create new rules based upon the trigger event. Any new rules or changes to rules may be noted in the PCC rule storage.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

OCS 160 may be used to track pre-paid usage of subscribers. For pre-paid usage charging occurs in real-time, where the service cost is deducted from the subscriber balance while the service is in operation. The OCS 160 may receive usage information from the PGW 134. Further the OCS 160 may install monitoring keys in the PGW 134 to monitor certain types of subscriber usage. The OCS 160 receives information related to usage limits associated with the subscriber. Further, the OCS 160 may receive threshold information based upon various desired usage thresholds. When a threshold is reached certain policies may become applicable. The OCS 160 may also communicate with the PCRN 136 via the Sy interface. The OCS 160 may send usage information to the PCRN 136. The OCS 160 may send indications when various thresholds have been exceeded such as for example an OUT_OF CREDIT event to the PGW 134, and the PGW 134 may then send an OUT_OF_CREDIT event trigger to the PCRN 136.

Typically a pre-paid subscriber of the subscriber network 100 may have a metering limit that defines a limit on the amount of resources that the subscriber may use. For example, a subscriber may have purchased 100 minutes. Other usage, for example, data usage may be metered as well.

For example, when a pre-paid subscriber places a call, they may be informed by a voice message that indicates how many remaining call minutes that the subscriber has. Alternatively, such a voice reminder may only occur when the remaining minutes of the pre-paid subscriber is less than a threshold amount. If during a call, the pre-paid subscriber runs out of minutes, the network may do one of three things: first, terminate the call; second, suspend the call and redirect the subscriber to purchase more minutes; and third, provide free minutes to the subscriber to complete the call. Because the PCRN 136 makes rule decisions, the PCRN 136 may receive an OUT_OF_CREDIT event trigger when the pre-paid subscriber has exceeded their usage limit. The PCRN may then apply rules to achieve a desired response to the OUT_OF_CREDIT event trigger.

Figure 2:
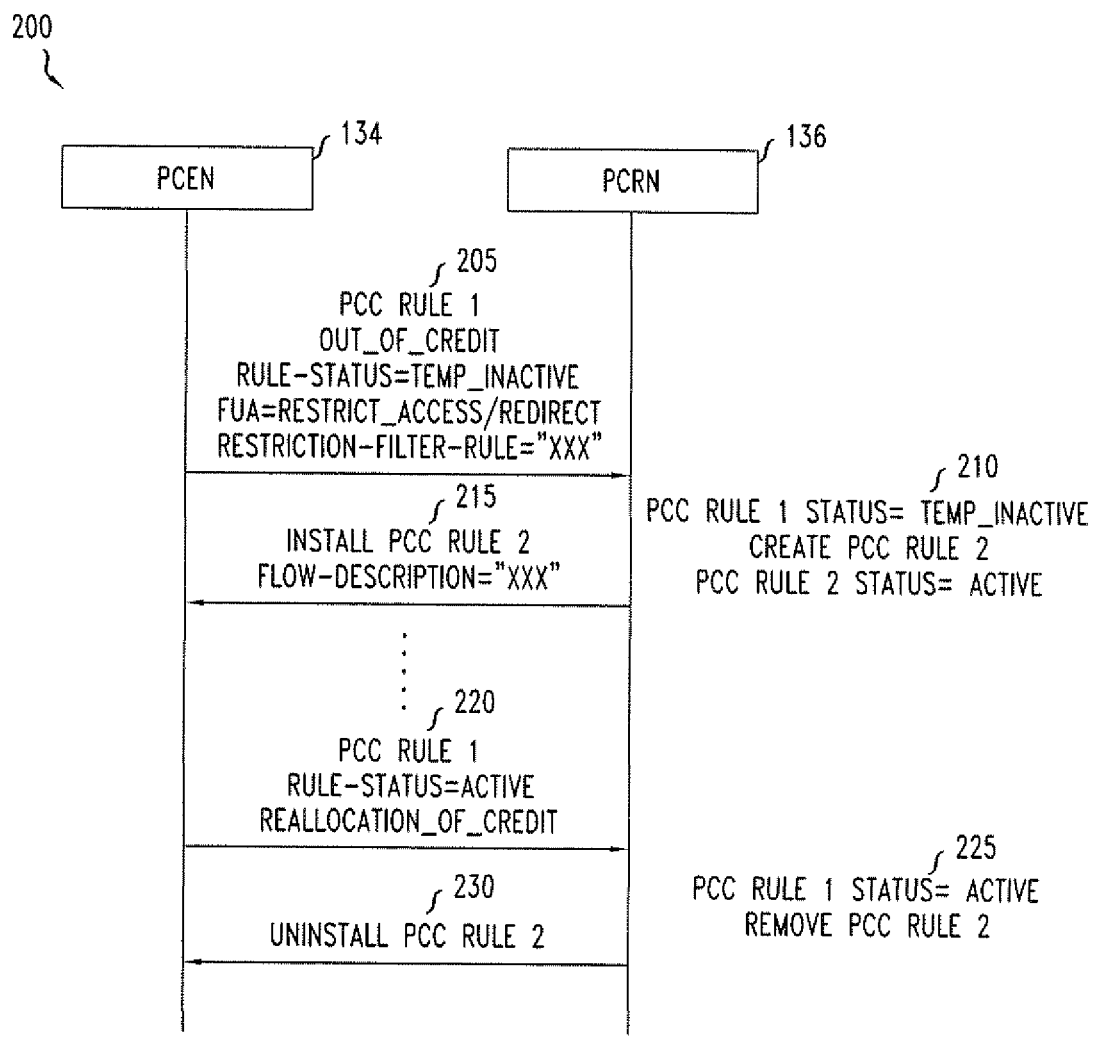
FIG. 2 illustrates an embodiment for the exchange of messages between a PCEN and PCRN in response to receiving an OUT_OF_CREDIT event.

FIG. 2 illustrates an embodiment for the exchange of messages between a PCEN and PCRN in response to receiving an OUT_OF_CREDIT event. First, PCEN 134 sends an OUT_OF_CREDIT trigger event 205 to the PCRN 136. In this example, the OUT_OF_CREDIT trigger event may be associated with PCC rule 1 which now may have a status of TEMPORARILY INACTIVE. Further, a final unit action (FUA) may be indicated. In this example, FUA RESTRICT_ACCESS and REDIRECT are involved. Also, when the PCEN 134 determines that the subscriber is OUT_OF_CREDIT, the PCEN 134 may set the rule-status of PCC rule 1 to TEMPORARILY INACTIVE. Other values for rule-status may include ACTIVE and INACTIVE.

Next, the PCRN 136 may create a second PCC rule, PCC rule 2, and the status of that rule may be set to ACTIVE 210. The action indicated by PCC rule 2 may be based upon the value of the FUA received with the OUT_OF_CREDIT trigger event. If the FUA was RESTRICT_ACCESS/REDIRECTION, then PCC rule 2 may be used to redirect the pre-paid subscriber to purchase more minutes. For example, the pre-paid subscriber may be connected with an operator or an automated system where more minutes may be purchased. Also, a pre-paid subscriber may be directed to a website in order to purchase more minutes. PCC rule 2 may also be used to allow the pre-paid subscriber to continue their call. In such a situation, the priority, QoS, or other performance parameters may be decreased for this subscriber and implemented in the PCC rule 2. Then the PCRN 136 may send a message to the PCEN 134 to install PCC rule 2 215.

Once the pre-paid subscriber has purchased more minutes, the PCEN 134 may receive a notification. As a result, the PCEN 134 may set the rule status of PCC rule 1 to ACTIVE. Next, the PCEN 134 may then send a REALLOCATION_OF_CREDIT trigger event 220 to the PCRN 136. Upon the receipt of the REALLOCATION_OF_CREDIT event trigger, the PCRN 136 may remove PCC rule 2 225. Next, the PCRN 136 may send a message to the PCEN 134 to uninstall PCC rule 2 from the PCEF 230.

Accordingly, when an OUT_OF_CREDIT event trigger occurs for a pre-paid subscriber, the PCRN 136 may use a second PCC rule in order to carry out a desired action as specified by the FUA. Further, because the rule-status of PCC rule 1 was indicated as TEMP_INACTIVE, the PCRN 136 knows that the pre-paid subscriber may not continue a call.

It should be noted that due to the ambiguity in related 3GPP specifications, it is possible that some PCENs 134 may not use PPC-rule-status value "TEMPORARILY INACTIVE" to implement to indicate "out of credit" event. For example, the PCEN 135 may not include PCC-rule-status AVP, or may set it to "ACTIVE", in the Charging-Rule-Report AVP for the effected PCC rules for the "out-of-credit" event. A second embodiment as described in FIG. 3 accounts for this situation.

Figure 3:
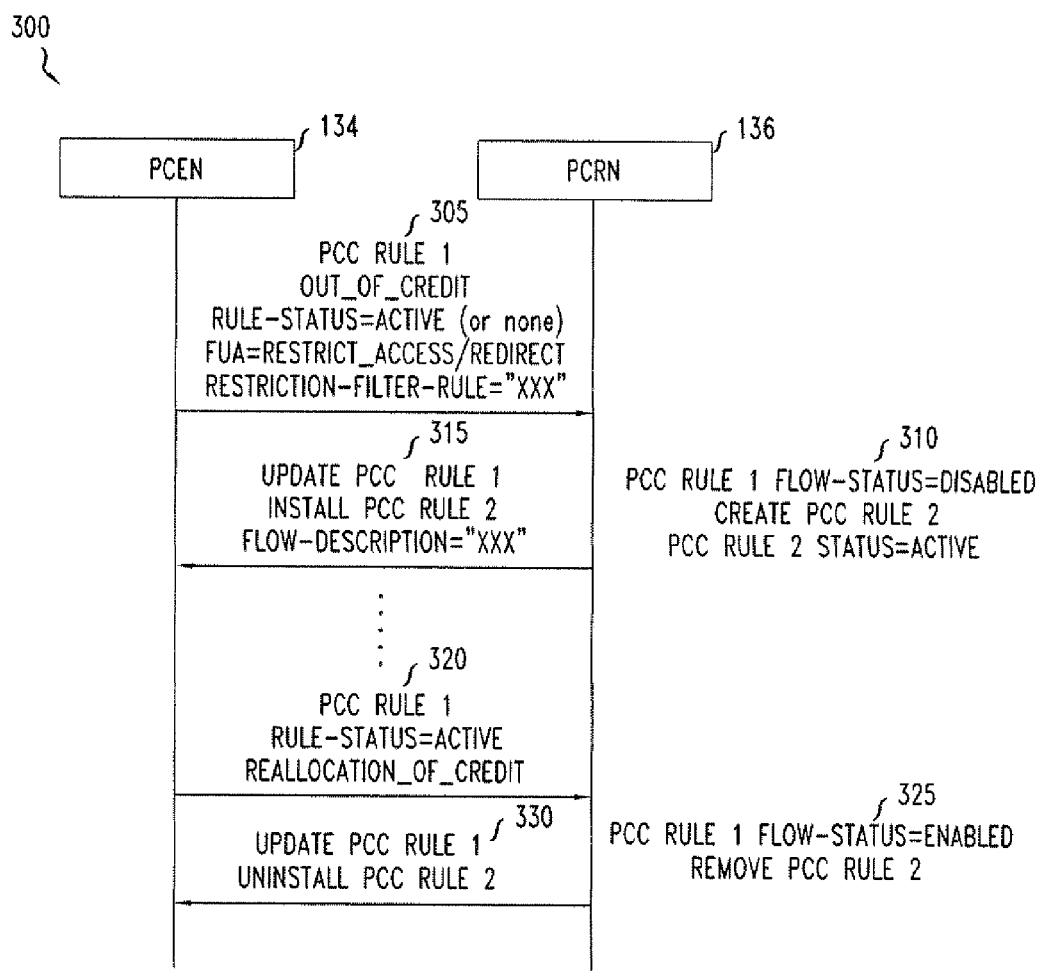
FIG. 3 illustrates another embodiment for the exchange of messages between a PCEN and PCRN in response to receiving an OUT_OF_CREDIT event.

FIG. 3 illustrates another embodiment for the exchange of messages between a PCEN and PCRN in response to receiving an OUT_OF_CREDIT trigger event. First, PCEN 134 sends an OUT_OF_CREDIT trigger event 305 to the PCRN 136. In this example, the OUT_OF_CREDIT trigger event may be associated with PCC rule 1, which may have a rule status of ACTIVE or no status indicated at all. Further, a final unit action (FUA) may be indicated. In this example, either RESTRICT_ACCESS or REDIRECT is provided. However, note that depending on the AVPs provided in Final-Unit-Indication, an out-of-credit event can lead to either restrictive or redirecting actions or both.

Next, the PCRN 136 may set the flow-status for PCC rule 1 to DISABLED 310. This may be done because the rule status received by the PCRN 136 indicates that the usage of the pre-paid subscriber related to PCC rule 1 may still be available to the pre-paid subscriber. Thus, by setting the flow-status for the PCC rule 1 to DISABLED, the PCRN 136 may be assured that the usage of the pre-paid subscriber related to PCC rule 1 has been stopped.

Further, the PCRN 136 may create a second PCC rule, PCC rule 2, and the rule status of that rule may be set to ACTIVE 310. The action indicated by PCC rule 2 may be based upon the value of the FUA received with the OUT_OF_CREDIT event trigger. If the FUA was RESTRICT_ACCESS or REDIRECTION, then PCC rule 2 may be used to redirect the pre-paid subscribe to purchase more minutes. For example, the pre-paid subscribe may be connected with an operator or an automated system where more minutes may be purchased. Also, a pre-paid subscriber may be directed to a website in order to purchase more minutes. Further, if the FUA is RESTRICT_ACCESS, the PCC rule 2 constructed based on provided "Restriction-Filter-Rule" may be used to allow the pre-paid subscriber to access free services when the subscriber is in out-of-credit state. In such a situation, the priority, QoS, or other performance parameters may be decreased for this subscriber and implemented in PCC rule 2. Then the PCRN 136 may send a message 315 to the PCEN 134 to install PCC rule 2 and to update PCC rule 1.

Once the pre-paid subscriber has purchased more minutes, the PCEN 134 may receive a reallocation of credit notification from OCS. As a result, the PCEN 134 may set the rule status of PCC rule 1 to ACTIVE. Next, the PCEN 134 may then send a REALLOCATION_OF_CREDIT trigger event 320 to the PCRN 136. Upon the receipt of the REALLOCATION_OF_CREDIT trigger event, the PCRN 136 may remove PCC rule 2 225 and set the flow-status of PCC rule 1 to ENABLED. Next, the PCRN 136 may send a message to the PCEN 134 to uninstall PCC rule 2 from the PCEF and to update PCC rule 1.

Accordingly, when an OUT_OF_CREDIT trigger event occurs for a pre-paid subscriber, the PCRN 136 may use a second PCC rule in order to carry out a desired action as specified by the FUA. In this embodiment, flow-status may be used to ensure that the usage of the pre-paid subscriber has been prevented because either the status of FCC rule 1 is either active or unknown.

Figure 4:
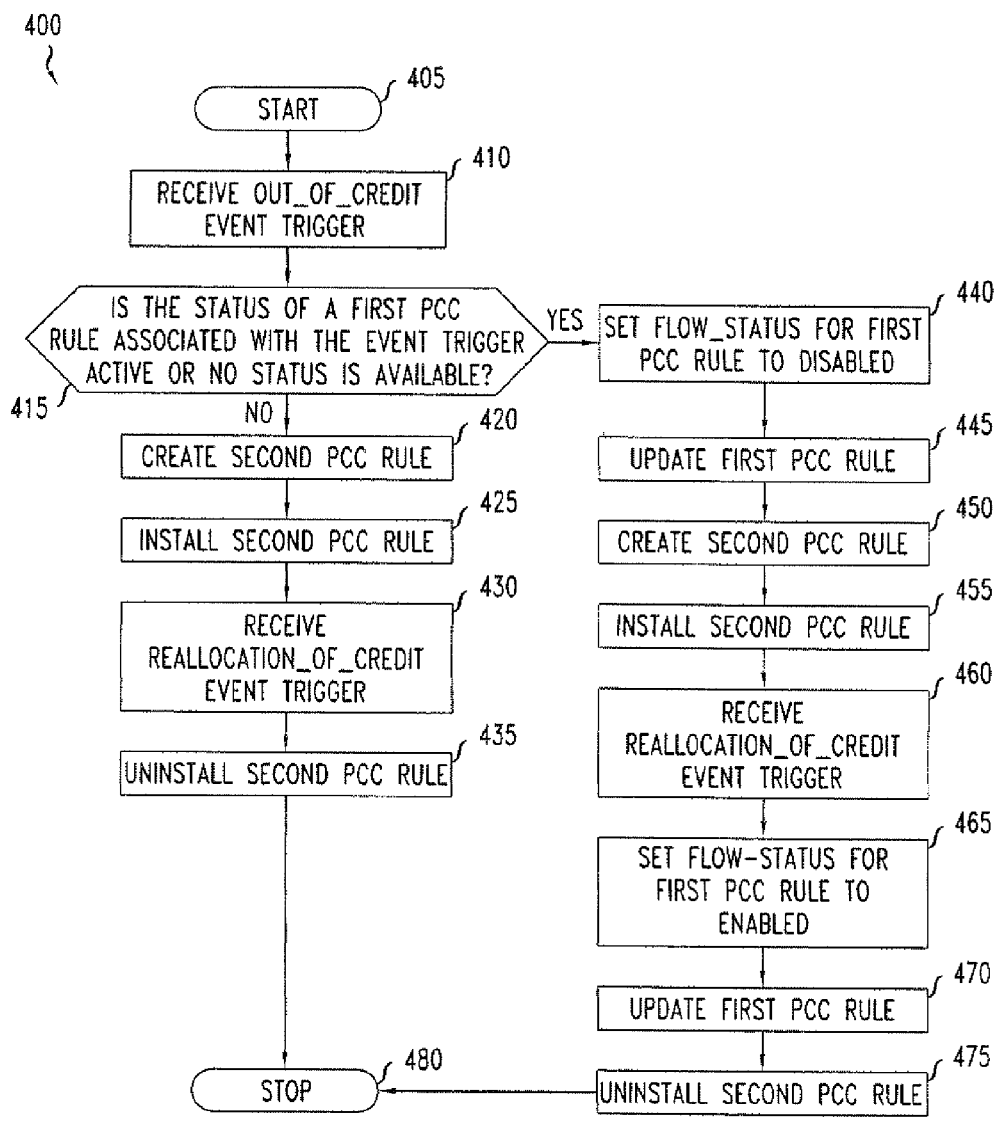
FIG. 4 illustrates a flow diagram illustrating a method of handling of an OUT_OF_CREDIT event.

FIG. 4 illustrates a flow diagram illustrating a method of handling of an OUT_OF_CREDIT event. The method 400 begins at step 405. Next, the PCRN 136 may receive and OUT_OF_CREDIT event trigger 410.

The PCRN 136 then may determine if the status of the first PCC rule associated with the event trigger is TEMP_INACTIVE 415. If so, then the PCRN 136 may create a second PCC rule 420. The second PCC rule may implement an action based upon an FUA received with the OUT_OF_CREDIT event trigger. The PCRN 136 may then install the second PCC rule 425 in the PCEN 134.

Next, the PCRN 136 may receive a REALLOCATION_OF_CREDIT event trigger 430. In response, the PCRN 136 may uninstall the second PCC rule 435. The method 400 may then end at 480.

If the status of the first PCC rule associated with the event trigger is ACTIVE, or the rule status is not provided, then the PCRN 136 may set the flow-status for the first PCC rule to DISABLED 440. The PCRN then may update the first PCC rule 445, which may include sending the update of the first PCC rule to the PCEN 134. Next, the PCRN 136 may create a second PCC rule 450. The second PCC rule may implement an action based upon an FUA received with the OUT_OF_CREDIT event trigger. The PCRN 136 may then install the second PCC rule 455 in the PCEN 134.

Next, the PCRN 136 may receive a REALLOCATION_OF_CREDIT event trigger 460. In response, the PCRN 136 may set the flow-status for the first PCC rule to ENABLED 465. Then the PCRN 136 may update the first PCC rule 470. Next the PCRN 135 may uninstall the second PCC rule 475. The method 400 may then end at 480.

While the above method was described as being carried out by a PCRN 136, other hardware elements that may implement the PCRF may be used to carry out the method as well.

When reference is made to PCC rule 1 and PCC rule 2, PCC rule 1 and PCC rule 2 may also encompass sets of rules.

It should be apparent from the foregoing description that various exemplary embodiments of the invention may be implemented in hardware and/or firmware. Furthermore, various exemplary embodiments may be implemented as instructions stored, on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN), the method comprising:
receiving an event trigger associated with a first set of policy and charging control (PCC) rules from a policy and charging enforcement node (PCEN) indicating that a subscriber is out of credit;
creating a second set of rules to handle the out of credit status of the subscriber;
installing the second set of rules;
receiving an indication that the subscriber has received a reallocation of credit;
uninstalling the second set of rules after receiving an indication that the subscriber has completed the reallocation of credit operation; and
determining that a first set of PCC rules associated with the event trigger has a temporary inactive status.

2. A method performed by a policy and charging rules node (PCRN), the method comprising:
receiving an event trigger associated with a first set of policy and charging control (PCC) rules from a policy and charging enforcement node (PCEN) indicating that a subscriber is out of credit;
creating a second set of rules to handle the out of credit status of the subscriber;
installing the second set of rules;

receiving an indication that the subscriber has received a reallocation of credit; and uninstalling the second set of rules after receiving an indication that the subscriber has completed the reallocation of credit operation;

determining that the first set of PCC rules associated with the event trigger has an active status or PCC-rule-status is not found in a corresponding charging-rule-report AVP;

setting a flow status for the first set of PCC rules to disabled; and after receiving an indication that the subscriber has received a reallocation of credit: setting the flow status for the first set of PCC rules to enabled after receiving an indication that the subscriber has received a reallocation of credit.

3. The method of claim 1, further comprising receiving a final unit action (FUA) from the PCEN, and wherein an action associated with the first set of PCC rules is based upon the FUA.

4. The method of claim 3, wherein the FUA indicates a redirection.

5. The method of claim 4, wherein the redirection directs the subscriber to a redirect server.

6. The method of claim 3, wherein the FUA indicates temporary free access for the subscriber.

7. The method of claim 1 further comprising:
receiving another event trigger associated with a first set of PCC rules from the PCEN indicating that a subscriber is out of credit;
determining that a third set of policy and charging control (PCC) rules associated with the other event trigger has a status of active or a rule status is not found in a corresponding charging-rule-report AVP;
setting a flow status for the third PCC rule to disabled;
installing a fourth set of PCC rules to handle the out of credit status of the subscriber;
receiving another indication that the subscriber has received a reallocation of credit;
setting the flow status for the third set of PCC rules to enabled after receiving an indication that the subscriber has received a reallocation of credit; and
uninstalling the fourth set of PCC rules after receiving an indication that the subscriber has received a reallocation of credit.

8. A policy and charging rules node (PCRN), comprising:
a network interface configured to:
receive an event trigger associated with a first set of policy and charging control (PCC) rules from a policy and charging enforcement node (PCEN) indicating that a subscriber is out of credit; and
receive an indication that the subscriber has received a reallocation of credit;
a PCC rules engine configured to:
create a second set of rules to handle the out of credit status of the subscriber;
install the second set of rules;
uninstall the second set of rules after receiving an indication that the subscriber has completed the reallocation of credit operation; and
determine that a first set of PCC rules associated with the event trigger has a temporary inactive status.

9. A policy and charging rules node (PCRN), comprising:
a network interface configured to:
receive an event trigger associated with a first set of policy and charging control (PCC) rules from a policy and charging enforcement node (PCEN) indicating that a subscriber is out of credit; and
receive an indication that the subscriber has received a reallocation of credit;
a PCC rules engine configured to:
create a second set of rules to handle the out of credit status of the subscriber;
install the second set of rules; and
uninstall the second set of rules after receiving an indication that the subscriber has completed the reallocation of credit operation;
determine that the first set of PCC rules associated with the event trigger has an active status or PCC-rule-status is not found in a corresponding charging-rule-report AVP;
set a flow status for the first set of PCC rules to disabled; and
after the network interface receives an indication that the subscriber has received a reallocation of credit: set the flow status for the first set of PCC rules to enabled after receiving an indication that the subscriber has received a reallocation of credit.

10. The PCRN of claim 8, wherein the network interface is further configured to receive a final unit action (FUA) from the PCEN, and wherein an action associated with the first set of PCC rules is based upon the FUA.

11. The PCRN of claim 10, wherein the FUA indicates a redirection.

12. The PCRN of claim 11, wherein the redirection directs the subscriber to a redirect server.

13. The PCRN of claim 10, wherein the FUA indicates temporary free access for the subscriber.

14. A non-transitory machine-readable storage medium encoded with instructions for execution by a policy and charging rules node (PCRN), the medium comprising:
instructions for receiving an event trigger associated with a first set of policy and charging control (PCC) rules from a policy and charging enforcement node (PCEN) indicating that a subscriber is out of credit;
instructions for creating a second set of rules to handle the out of credit status of the subscriber;
instructions for installing the second set of rules;
instructions for receiving an indication that the subscriber has received a reallocation of credit;
instructions for uninstalling the second set of rules after receiving an indication that the subscriber has completed the reallocation of credit operation; and
instructions for receiving a final unit action (FUA) from the PCEN, and wherein an action associated with the first set of PCC rules is based upon the FUA.

15. A non-transitory machine-readable storage medium encoded with instructions for execution by a policy and charging rules node (PCRN), the medium comprising:
instructions for receiving an event trigger associated with a first set of policy and charging control (PCC) rules from a policy and charging enforcement node (PCEN) indicating that a subscriber is out of credit;
instructions for creating a second set of rules to handle the out of credit status of the subscriber;
instructions for installing the second set of rules;
instructions for receiving an indication that the subscriber has received a reallocation of credit;
instructions for uninstalling the second set of rules after receiving an indication that the subscriber has completed the reallocation of credit operation;

instructions for determining that the first set of PCC rules associated with the event trigger has an active status or PCC-rule-status is not found in a corresponding charging-rule-report AVP;

instructions for setting a flow status for the first set of PCC rules to disabled; and instructions for after receiving an indication that the subscriber has received a reallocation of credit: setting the flow status for the first set of PCC rules to enabled after receiving an indication that the subscriber has received a reallocation of credit.

16. The non-transitory machine-readable storage medium of claim 14, wherein the FUA indicates a redirection.

17. The non-transitory machine-readable storage medium of claim 14, further comprising instructions for determining that the first set of PCC rules associated with the event trigger has a temporary inactive status.

* * * * *